US009002007B2

(12) United States Patent
Nabeel et al.

(10) Patent No.: US 9,002,007 B2
(45) Date of Patent: Apr. 7, 2015

(54) EFFICIENT, REMOTE, PRIVATE TREE-BASED CLASSIFICATION USING CRYPTOGRAPHIC TECHNIQUES

(75) Inventors: Mohamed Nabeel, West Lafayette, IN (US); David G. Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 13/020,708

(22) Filed: Feb. 3, 2011

(65) Prior Publication Data

US 2012/0201378 A1 Aug. 9, 2012

(51) Int. Cl.
*H04L 29/06* (2006.01)
*H04L 9/00* (2006.01)

(52) U.S. Cl.
CPC ............. *H04L 9/008* (2013.01); *H04L 2209/50* (2013.01)

(58) Field of Classification Search
CPC ..................... H04L 9/008; H04L 2209/50
USPC ............... 713/168, 169; 380/28; 707/757
See application file for complete search history.

(56) References Cited

U.S. PATENT DOCUMENTS

| 4,200,770 | A | * | 4/1980 | Hellman et al. | ............... | 380/30 |
| 6,167,392 | A | * | 12/2000 | Ostrovsky et al. | ............... | 1/1 |
| 7,391,905 | B2 | | 6/2008 | Avidan et al. | | |
| 7,526,084 | B2 | | 4/2009 | Smaragdis et al. | | |
| 7,577,252 | B2 | | 8/2009 | Avidan et al. | | |
| 7,657,028 | B2 | | 2/2010 | Avidan et al. | | |
| 7,685,115 | B2 | | 3/2010 | Avidan et al. | | |
| 2006/0085651 | A1 | * | 4/2006 | Staddon et al. | ............... | 713/193 |
| 2007/0076874 | A1 | * | 4/2007 | Suleiman et al. | ............. | 380/243 |
| 2008/0294909 | A1 | * | 11/2008 | Ostrovsky et al. | ............ | 713/189 |
| 2011/0131222 | A1 | * | 6/2011 | DiCrescenzo | ................ | 707/757 |
| 2011/0243320 | A1 | * | 10/2011 | Halevi et al. | .................... | 380/30 |

OTHER PUBLICATIONS

J. Brickell and V. Shmatikov, "Privacy-Preserving Classifier Learning", Financial Cryptography and Data Security, Lecture Notes in Computer Science, vol. 5628. ISBN 978-3-642-03548-7. Springer Berlin Heidelberg, 2009, p. 128.*
J. J Zhan, "Using Homomorphic Encryption for Pricacy-Preserving Collaborative Decision Tree Classification", Proceedings of the 2007 IEEE Symposium on Computational Inelligence and Data Mining, p. 637-645.*
J. Brickell, D. Porter, V. Shmatikov, and E. Witchel,"Privacy-Preserving Remote Diagnostics", CCS ACM, 2007.*
Barni, M., Failla, P., Kolesnikov, V., Lazzeretti, R., Sadeghi, A.-R., Schneider, T.: Secure evaluation of private linear branching programs with medical applications (Full Version). Cryptology ePrint Archive, Report 2009/195 (2009).*

(Continued)

*Primary Examiner* — Bradley Holder
*Assistant Examiner* — Ali Shayanfar
(74) *Attorney, Agent, or Firm* — Blakely, Sokolof, Taylor & Zafman LLP

(57) ABSTRACT

A method and apparatus are disclosed herein for classification. In one embodiment, the method comprises performing tree-based classification of a user input by a classifier with a classification tree at a first location, including exchanging data with a second location, different from the first location, to obtain the user input and provide results of classification to a user using singly homomorphic encryption so that the user input is not revealed to the classifier, the classification tree is not revealed to the user and the classifier's output is not revealed to the classifier.

14 Claims, 10 Drawing Sheets

(56) References Cited

OTHER PUBLICATIONS

Naor et al. "Oblivious Polynomial Evaluation",—Mar. 15, 2005, retrieved from http://www.wisdom.weizmann.ac.il/~naor/PAPERS/ope.pdf.*

Brickell J. et al.:"Privacy-preserving remote diagnostics," ACM Conference on Computer and Communications Security, CCS '07, 2007, p. 498.*

Zhang et al, "Using Homomorphic Encryption for Privacy-Preserving Collaborative Decision Tree Classification", IEEE, 2007, pp. 637-645.*

Agrawal, R, et al, "Privacy-Preserving Data Mining," SIGMOD Rec, vol. 29, No. 2, 2000, pp. 439-450.

Ben-Or, M, et al, "Completeness Theorems for Non-Cryptographic Fault-Tolerant Distributed Computation," STOC '88: Proceedings of the Twentieth Annual ACM Symposium on Theory of Computing, 1988, pp. 1-10.

Chang, YC, et al, "Oblivious Polynomial Evaluation and Oblivious Neural Learning," Theor Comput Sci, vol. 341, No. 1, 2005, pp. 39-54.

Clifton, C, et al, "Tools for Privacy Preserving Distributed Data Mining," SIGKDD Explor Newsl, vol. 4, No. 2, 2002, pp. 28-34.

Du, W, et al, "Building Decision Tree Classifier on Private Data," CRPIT '14: Proceedings of IEEE International Conference on Privacy, Security, and Data Mining, 2002, pp. 1-8.

Gamal, T El, "A Public Key Cryptosystem and a Signature Scheme Based on Discrete Logarithms," Proceedings of CRYPTO 84 on Advances in Cryptology, 1985, pp. 10-18.

Even, S, et al, "A Randomized Protocol for Signing Contracts," Commun ACM, vol. 28, No. 4, 1985, pp. 637-647.

Li, Hd, et al, "Oblivious Polynomial Evaluation," J Comput Sci Technol, vol. 19, No. 4, Jul. 2004, pp. 550-554.

Lindell Y, et al, "Privacy Preserving Data Mining," CRYPTO '00: Proceedings of the 20$^{th}$ Annual International Cryptology Conference on Advances in Cryptology, 2000, pp. 36-54.

Naor, M, et al, "Oblivious Transfer and Polynomial Evaluation," STOC '99: Proceedings of the 31$^{st}$ Annual ACM Symposium on Theory of Computing, 1999, pp. 245-254.

Naor, M, et al, "Efficient Oblivious Transfer Protocols," SODA '01: Proceedings of the 12$^{th}$ Annual ACM-SIAM Symposium on Discrete Algorithms, 2001, pp. 448-457.

Naor, M, et al, "Oblivious Polynomial Evaluation," SIAM J Comput, vol. 35, No. 5, 2006, pp. 1254-1281.

Paillier, P, "Public-Key Cryptosystems Based on Composite Degree Residuosity Classes," EUROCRYPT '99: Proceedings of the 17$^{th}$ International Conference on Theory and Application of Cryptographic Techniques, 1999, pp. 223-238.

Pinkas, B, "Cryptographic Techniques for Privacy-Preserving Data Mining," SIGKDD Explor Newsl, vol. 4, No. 2, 2002, pp. 12-19.

Rabin, Mo, "How to Exchange Secrets with Oblivious Transfer," Cryptology ePrint Archive, Report 2005/187, 2005, <http://eprint.iacr.org/>.

Yao, ACC, "How to Generate and Exchange Secrets," SFCS '86: Proceedings of the 27$^{th}$ Annual Symposium on Foundations of Computer Science, 1986, pp. 162-167.

Communication for Related European Patent Application No. 12153505.8, mailed Mar. 27, 2014, 7 pages.

Barni, Mauro, et al., "Efficient Privacy-Preserving Classification of ECG Signals" Information Forensics and Security—WIFS 2009, Dec. 6, 2009, pp. 91-95, XP031615135, ISBN: 978-1-4244-5279-8.

Brickell, J., et al., "Privacy-Preserving Remote Diagnostics," ACM Conference on Computer and Communications Security—CCS '07, 2007, pp. 498-507, XP055107514, DOI: 10.1145/1315245.1315307, ISBN: 978-1-59-593703-2.

Naor, M., et al., "Obvious Polynomial Evaluation," Mar. 15, 2005, 31 pages, XP055108652, from: http://www.wisdom.weizmann.ac.il/~naor/PAPERS/ope.pdf.

* cited by examiner

An Example Decision Tree With Our Notations

Perform tree-based classification of a user input by a classifier with a classification tree at a first location, which includes processing logic exchanging data with a second location, different from the first location, to obtain the user input and provide results of classification to a user using singly homomorphic encryption so that the user input is not revealed to the classifier and the classification tree is not revealed to the user
201

FIG. 2

Algorithm 1 Linear decision tree classifier

1: Randomize internal node indices of the classification tree
2: for each randomized node $i = 1$ to $m$ do
3:    Create an OPE protocol with the client as the sender
4:    for each OPE protocol do
5:      Engage in $n \times l$ OT$_1^2$ protocols with the client as chooser
6:    end for
7:    Compute $f_1(x_i, y_1, \theta_i) + \Sigma_{i,j} r_{1ij}$ where $r_{ij}$'s are the random elements of $F_q$ introduced in the OT$_1^2$ protocols
8:    Send the output to the user
9: end for
10: Receive $P$-dimensional encrypted binary vector $Z'$ containing splitting decision at each node and the complementary encrypted binary vector $Z''$.
11: for each path $i$ from 1 to $P$ do
12:    for each node $j$ in the path $i$ do
13:      Choose either $Z'[j]$ or $Z''[j]$ to compute $v_i$ depending on the splitting decision
14:    end for
15:    Set $V[i] = v_i$
16: end for
17: Send $V$ to the client

FIG. 3

Algorithm 2 User

1: Set input data $x$
2: for each element $i = 1$ to $n$ in $x$ do
3:    for each index position $j = 0$ to $l - 1$ do
4:       Compute $(r_{ij}, v_{ij} + r_{ij})$ pair
5:    end for
6: end for
7: {The same randomized order as in the classifier}
8: for each node $i = 1$ to $m$ do
9:    Create an OPE protocol wit the classifier as the receiver
10:    for each OPE protocol do
11:       Engage in $n \times l$ $OT_1^2$ protocols with the classifier as the sender and the classifier chooses either $r_{ij}$ or $v_{ij} + r_{ij}$ depending on its coefficient value
12:    end for
13:    Receive $f_i(x, y_i, \theta_i) + \Sigma_{i,j} r_{ij}'$ where $r_{ij}'$'s are the randoms introduced in the $OT_1^2$ protocols
14:    Set output bit in $Z[i]$ based on the output of the splitting decision
15: end for
16: Compute $Z'$ and $Z''$ from $Z$, and send $Z'$ and $Z''$ to the classifier
17: Receive the encrypted class label vector $V$ from the classifier
18: for $i = 1$ to $P$ do
19:    $v \leftarrow$ Decrypt $V[i]$
20:    if $v$ is in the domain of the class labels then
21:       Decide $v$ as the label of $x$ {There in only one such vale out of $P$}
22:       Break
23:    end if
24: end for

FIG. 5

Algorithm 3 ID splitting rule evaluation at the classifier

1: Randomly permute the internal node indices of the classification tree
2: for each randomized node $i = 1$ to $m$ do
3:    $j \leftarrow$ Index of the single non-zero element in $y_i$
4:    $y \leftarrow y_i[j]$
5:    $V_j \leftarrow v_{ij}$ values corresponding to $x[j]$
6:    Create an output vector $O$ of $m$ elements and assign $\mathcal{E}(0)$ to each element
7:    for each non-zero position $k$ of the binary representation of $y$ do
8:      $O[i] = O[i] \times V_j[k]$
9:    end for
10:   $O[i] = O[i] \times \mathcal{E}(-\theta_i)$
11:   Send $O$ to the user
12: end for

FIG. 7

An Example Classification Tree

The Classification Tree

US 9,002,007 B2

EFFICIENT, REMOTE, PRIVATE TREE-BASED CLASSIFICATION USING CRYPTOGRAPHIC TECHNIQUES

FIELD OF THE INVENTION

Embodiments of the present invention relate to the field of classifiers and their use in classification; more particularly, embodiments of the present invention relate to pairing tree-based classification and data observation methods, including embodiments using secure and oblivious processing.

BACKGROUND OF THE INVENTION

The cloud computing model has attracted many businesses mainly due to its zero capital investment, flexibility as well as reduced operational cost. The model has changed the way companies do business into a utility model where one pays as per the usage. Computing as a service (CaaS) is an emerging branch of cloud computing where companies can utilize computational power and processing logics without needing to have licensed software copies, own processing logics and computing hardware setup in-house. One type of computation is that in a candidate for use in this way is tree-based classification. With the exponential growth of data, there is a real need to perform pattern recognition and mining on large data sets.

Even though CaaS provides many benefits, security and privacy concerns have still been the main factors keeping many companies from moving to the cloud. It is challenging to secure the input data since users need to allow the service provider to perform computations over the data without revealing them. Classification as a service has the added challenge of securing the classifier and the training set the service provider uses to train the tree.

Consider the following scenario. A user (client) has a set of images (X). The user may want to classify the images in order to determine whether they contain, for example, faces. The user does not have the resources and/or expertise to run a classification algorithm to classify them. Therefore, it wants to delegate the classification task f to a remote classifier (server in the cloud) and obtain the decision $f(x)$ where $x \in X$. The following are the security and privacy requirements.

1. The user does not want to reveal the images (x values) to the classifier.
2. The classifier does not want to reveal its classification algorithm $f$ to the user, other than the information that can be inferred from $f(x)$.
3. The user does not want the classifier to learn the classification decision $f(x)$.

Below is a short description of some of the computational primitives that are well-known in the art.
Computational Primitives
Oblivious Transfer In 1-out-of-2 Oblivious Transfer ($OT_1^2$), one party, the sender, has input composed of two strings ($M_0$, $M_1$), and the input of a second party, the chooser, is a bit σ. The chooser should learn $M_\sigma$ and nothing regarding $M_{1-\sigma}$, while the sender should gain no information about σ. 1-out-of-N OT is an extension of $OT_1^2$ where the chooser learns one $M_i (1 \le i \le N)$ and nothing else. k-out-of-NOT is a generalization of $OT_1^N$. For more information, see M. O. Rabin, "How to Exchange Secrets with Oblivious Transfer," Cryptology ePrint Archive, Report 2005/187, 2005, http://eprint.iacr.org/; S. Even, et al., "A Randomized Protocol for Signing Contracts," *Commun. ACM,* 28(6):637-647, 1985; and M. Naor et al., "Efficient Oblivious Transfer Protocols," In *SODA '01: Proceedings of the twelfth annual ACM-SIAM symposium on Discrete algorithms,* pages 448-457, Philadelphia, Pa., USA, 2001, Society for Industrial and Applied Mathematics.
Oblivious Polynomial Evaluation An OPE protocol has two parties, the sender who has a polynomial $f$ over some finite field $\mathbb{F}_p$ and the receiver has an input $x \in \mathbb{F}_p$. At the end of the protocol, the receiver learns $f(x)$ and nothing else, and the sender learns nothing. For more information on OPE, see M. Naor, et al., "Oblivious Transfer and Polynomial Evaluation," In *STOC '99: Proceedings of the thirtyfirst annual ACM symposium on Theory of computing,* pages 245-254, New York, N.Y., USA, 1999. ACM; H.-D. Li, et al., "Oblivious Polynomial Evaluation," *J. Comput. Sci. Technol.,* 19(4):550-554, 2004; M. Naor, et al., "Oblivious Polynomial Evaluation," *SIAM J. Comput.,* 35(5):1254-1281, 2006; and Y.-C. Chang, et al., "Oblivious Polynomial Evaluation and Oblivious Neural Learning, *Theor. Comput. Sci.,* 341(1):39-54, 2005.
Homomorphic Encryption An asymmetric cryptosystem—which consists of key generation, encryption (E) and decryption (D) functions—is homomorphic if for any given public key and any two plaintext messages $m_1$, $m_2$ in the plaintext space, the following encryption relationship holds:

$$E(m_1 \odot m_2) = E(m_1) \odot E(m_2),$$

where $\odot$ is a binary operator. If the operator is addition, the cryptosystem is additive homomorphic (e.g., P. Paillier, "Public-Key Cryptosystems Based On Composite Degree Residuosity Classes," In *EUROCRYPT '99: Proceedings of the 17th international conference on Theory and application of cryptographic techniques,* pages 223-238, Berlin, Heidelberg, 1999, Springer-Verlag) and if the operator is multiplication, the cryptosystem is multiplicative homomorphic (e.g., T. El Gamal, "A Public Key Cryptosystem and a Signature Scheme Based On Discrete Logarithms," In *Proceedings of CRYPTO 84 on Advances in cryptology,* pages 10-18, New York, N.Y., USA, 1985. Springer-Verlag New York, Inc.).
Oblivious Transfer All known OT protocols require public key cryptography (PKC). PKC involves modular exponentiation. Hence, the computation overhead is more demanding than its communication overhead. Herein, implementations of $OT_1^2$ and $OT_1^N$ are described which closely follows the protocols proposed by Naor and Pinkas, "Efficient Oblivious Transfer Protocols," In *SODA '01: Proceedings of the twelfth annual ACM-SIAM symposium on Discrete algorithms,* pages 448-457, Philadelphia, Pa., USA, 2001. Society for Industrial and Applied Mathematics.
1-Out-of-2 Oblivious Transfer The chooser's input is $\sigma \in 0, 1$, and the sender's input is two strings $M_0$, $M_1$. The chooser's output is $M_\sigma$. The protocol operates over a group $\mathbb{Z}_q$ of prime order and g is a generator of the group. The construction uses a function H that is modeled as a random oracle, i.e. chosen as a truly random function available to any participant and usually implemented as a hash function such as SHA.
The Protocol Using ElGamal Encryption 1. The sender chooses a random element $r_s \in \mathbb{Z}_q$ and publishes it.
2. The chooser picks a random $r_c \in \mathbb{Z}_q$ and sets the public keys $PK_\sigma = g^{r_c}$ and $PK_{1-\sigma} = r_s/PK_\sigma$ and sends $PK_0$ to the sender.
3. The sender computes $PK_1 = r_s/PK_0$ and chooses randoms $r_1, r_2 \in \mathbb{Z}_q$. It encrypts $M_0$ by $E_0$ as the tuple $\langle g^{r_0}, H(PK_0^{r_0})$ ⊕M$_0$⟩, where ⊕ is a bit-wise binary operator, and encrypts E$_1$=⟨g$^{r_1}$,H(PK$_1$$^{r_1}$)⊕M$_1$⟩, and sends them to the chooser.

4. The chooser computes H((g$^{r_o}$)$^{r_c}$)=H(PK$_o$$^{r_o}$) and uses it to decrypt M$_o$.

The same r=r$_1$=r$_2$ can be used to provide the same level of privacy and security. With the same r, the sender needs to compute three exponentiations (one of them can be precomputed before the protocol begins) and the chooser needs to compute two exponentiations (one of them can be precomputed). Assuming q is a n-bit prime number, the communication complexity is 2n (from chooser)+n+2 log$_2$|M| (from sender). The complexity is 5n if messages are elements of $\mathbb{Z}_q$ and one random value r is used.

Oblivious Polynomial Evaluation

The OPE protocol introduced by Chang and Lu, "Oblivious Polynomial Evaluation and Oblivious Neural Learning," *Theor. Comput. Sci.*, 341(1):39-54, 2005, employs OT$_1$$^2$.

The polynomials are over a finite field $\mathbb{F}_q$ where q is a an l-bit prime number. The receiver has the input x$_*$∈$\mathbb{F}_q$ and the sender has the polynomial of degree d, $f(x)=\Sigma_{i=0}^{d}a_i x^i$.

Each coefficient ai is represented as follows:

$$a_i = \sum_{j=1}^{l} a_{ij} 2^{j-1}, a_{ij} \in \{0, 1\} \quad (1)$$

For each i∈[1, d] and each j∈[1,l], the receiver computes the value v$_{ij}$ as follows:

$$v_{ij}=2^{j-1}x_*^i.$$

Notice that for each i∈[1, d] the following holds:

$$\sum_{j=1}^{l} a_{ij} v_{ij} = a_i x_*^i.$$

The protocol using OT$_1$$^2$:
1. The receiver prepares dl pairs of (r$_{ij}$, v$_{ij}$+r$_{ij}$) where each r$_{ij}$ is chosen uniformly at random from $\mathbb{F}_q$.
2. For each pair of (r$_{ij}$, v$_{ij}$+r$_{ij}$), the sender runs an OT$_1$$^2$ with the receiver to get r$_{ij}$ if a$_{ij}$=0 and v$_{ij}$+r$_{ij}$ otherwise.
3. The sender computes the sum of a$_0$ and the output of the dl OT$_1$$^2$ protocols which is equal to a$_0$+$\Sigma_{i=1}^{d}\Sigma_{j=1}^{l}$(a$_{ij}$v$_{ij}$+r$_{ij}$)=$f$(x$_*$)+$\Sigma_{i,j}$r$_{ij}$. The receiver subtracts $\Sigma_{i,j}$r$_{ij}$ from sender's output and obtains $f$(x$_*$).

The dominant operation in this protocol is the OT$_1$$^2$ operations. The complexity is dl times that of OT$_1$$^2$. (Five exponentiation and three inverse operations per OT$_1$$^2$).

The protocol using additive homomorphic encryption (HE) is as follows:
1. The receiver prepares dl values of E(v$_{ij}$).
2. For each value of E$_{ij}$, the sender picks 1 if a$_{ij}$=0 and E(v$_{ij}$) otherwise.
3. The sender computes the sum of a$_0$ and the output of the dl encrypted values which is equal to E(a$_0$)× $\Pi_{i=1}^{d}\Pi_{j=1}^{l}$E$_{ij}$=E($f$(x$_*$)). The receiver decrypts and obtains $f$(x$_*$).

The dominant operation in this protocol is the HE operations. The complexity is 2dl times that of encryption (i.e., one exponentiation per encryption). Compared to the first protocol, the number of exponentiations in the second approach is reduced by half. Compared to the first protocol and assuming that the ciphertext space is same as the plaintext space, the communication complexity in the second approach is reduced by two thirds.

Additional techniques related to those described above include privacy preserving data mining (PPDM). In PPDM research, the main focus has been to collectively learn a predictive model while addressing privacy and security concerns. In such research, there are two main branches of problems. The final goal of both branches is to train a predictive model, but the two branches make different assumptions and have different settings. The first category (perturbed input problem) addresses the problem of keeping the input to the data mining party, i.e., the classifier, private and creating the predictive model. The second category (private party input problem) address the following problem: there are several parties having input data and they collectively want to create a predictive model while each party keeping their input data private for the other involving parties.

In the private party input problem, the input data from different parties could be either horizontally or vertically partitioned. With horizontally partitioned data, each party has complete data sets for all the features under consideration. In contrast, with vertically partitioned data, each party does not have complete data sets for the features under consideration, i.e., each has partial input data to construct complete data sets. In the ideal situation, at the end of the data mining procedure, each party knows only their data, vertically or horizontally partitioned, and the trained predictive model.

In the perturbed input problem, as the name suggests, the user, that owns the input data, adds "noise" (e.g., generalization, distortion, etc.) to the data before the data mining process and then use reconstruction techniques to recover the original cumulative distribution (not the original values). The noise hides the data from the classifier. However, it is difficult to quantify the level of privacy and security that such a method provides. Further, the predictive model has some amount of false positives as well as negatives due to the noise. After learning the predictive model from the perturbed data, the model can classify non-perturbed data. In order to protect user inputs, the user is given the predictive model to locally run the classification algorithm. While such an approach preserve the privacy of the user inputs, it fails to protect the predictive model.

SUMMARY OF THE INVENTION

A method and apparatus are disclosed herein for classification. In one embodiment, the method comprises performing tree-based classification of a user input by a classifier with a classification tree at a first location, including exchanging data with a second location, different from the first location, to obtain the user input and provide results of classification to a user using singly homomorphic encryption so that the user input is not revealed to the classifier, the classification tree is not revealed to the user and the classifier's output is not revealed to the classifier.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2 is a flow diagram of one embodiment of a process for processing data using approaches described herein.

FIG. 3 illustrates pseudo code of one embodiment of an algorithm performed at the classifier.

FIG. 5 is pseudo code for one embodiment of an algorithm of the operations performed by the user when using the classifier.

FIG. 7 is pseudo code for one embodiment of an algorithm performed at a classifier for evaluating the splitting rule at each internal node.

DETAILED DESCRIPTION OF THE PRESENT INVENTION

Figure 1:
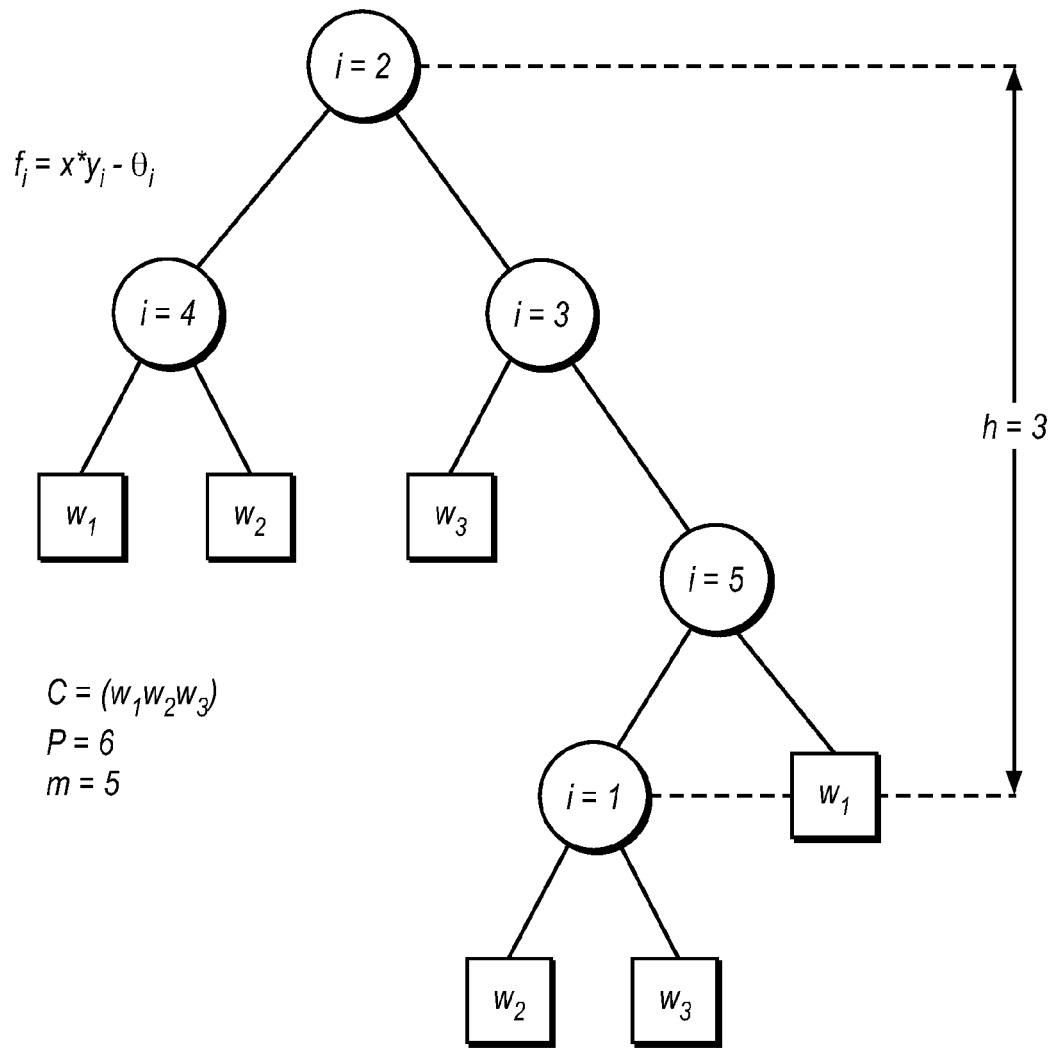
FIG. 1 illustrates an example decision tree with notations used herein.

The following discloses novel approaches to perform oblivious tree-based classification. One approach is based on the oblivious transfer protocol whereas another approach is based on an additive homomorphic cryptosystem. In one embodiment, tree-based classification is combined with a homomorphic encryption based novel oblivious polynomial evaluation protocol that is much more efficient than the existing protocols. In one embodiment, new protocols are constructed and practical cryptographic techniques are used, thereby allowing performance of certain arithmetic operations on encrypted data.

Techniques described herein may be used in a service model.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Notations

Table 1 summarizes all the symbols and notations used herein.

| Notation | Description |
|---|---|
| x | User's single input |
| X | User's set of inputs |
| y | Classifier's feature vector at each internal node of the classification tree. For ID3, there is only one none-zero element, for the general case, there can be more than one non-zero element. |
| n | The number of elements in x and y |
| m | The number of internal nodes |
| C | The set of class labels |
| $v_{ij}$ | The value of $(j-1)^{th}$ position of the $i^{th}$ coefficient of a polynomial |
| Γ | The matrix of all $v_{ij}$ values |
| P | The number of paths (=the number of leaf nodes) in the decision tree |
| ϵ | Encryption function |
| Z | User's output vector of binary values at each node |
| Z' | Encrypted vector of Z, i.e., $\epsilon(Z[i])$ for $i = 1, 2, \ldots, n$ |
| Z" | Encrypted vector of the complement of Z, i.e., $\epsilon(1 - Z[i])$ for $i = 1, 2, \ldots, n$ |
| V | The classifier's encrypted final output vector for $i = 1, 2, \ldots, n$ |
| h | The height of the classification tree, i.e., the number of layers |
| $f_i$ | The (binary) splitting rule as function at the node i |

-continued

| Notation | Description |
| --- | --- |
| $\theta_i$ | The threshold value at the node i where the splitting rule looks like $f_i = x^t y_i - \theta_i$. |
| O | Encrypted output of all the splitting rules |
| P | The prime order of the finite field $\mathcal{F}_p$ |
| l | The bit length of the size of the elements in x, y and of $\theta$. $f_i$'s are evaluated over a finite field whose length of the prime order is no more than l. |

An ID3 Algorithm

Initially, the focus is on privately classifying input data based on a tree with branching factor set to 2 as it involves only single variable linear decisions. Then the techniques are extended to multivariate decision trees.

The following is assumed:
The classification tree is already learned.
The branching factor is 2.
The number of categories and class labels are public.
There are two parties. The user, who has a private input vector $x=(x_1, x_2, \ldots x_n)^t$ and the classifier, who has a trained classification tree. The user wants to find the class label of her input out of all possible class labels $C=\{w_1, w_2, \ldots, w_t\}$. The following are the privacy and security requirements.
1. The user does not want to reveal x to the classifier.
2. The classifier does not want to reveal the classification tree to the user, specifically the decision computed by the tree.
3. The user does not want to reveal the class label for her input to the classifier.

An example of a classification tree is shown in FIG. 1.

Multiple approaches are proposed herein. In one embodiment, $OT_1^2$ is used for the evaluation of internal nodes of the tree. In another embodiment, additive homomorphic encryption is used for the evaluation of the internal nodes of the tree. Both of these approaches use additive homomorphic encryption for the evaluation of the class label. For purposes herein, the first is referred to as the OT based approach and the latter is referred to as the HE based approach.

FIG. 2 is a flow diagram of one embodiment of a process for processing data using either of the two approaches. The process is performed by processing logic that may comprise hardware (circuitry, dedicated logic, etc.), software (such as is run on a general purpose computer system or a dedicated machine), or a combination of both. In one embodiment, the processing logic is part of a classifier.

Referring to FIG. 2, the process comprises processing logic performing tree-based classification of a user input by a classifier with a classification tree at a first location, which includes processing logic exchanging data with a second location, different from the first location, to obtain the user input and provide results of classification to a user using singly homomorphic encryption so that the user input is not revealed to the classifier and the classification tree is not revealed to the user (processing block 201). In one embodiment, the singly homomorphic encryption uses a bit-wise polynomial representation of inputs and weights for classification. In one embodiment, the polynomial representation represents polynomials as sums. In one embodiment, the singly homomorphic encryption comprises additive homomorphic encryption. In one embodiment, the singly homomorphic encryption comprises homomorphic encryption based oblivious polynomial evaluation protocol.

OT Based Approach

The user and the classifier executes an OPE protocol for each node in the classification tree. The classifier chooses nodes uniformly at random so that the user does not learn the relative location of the nodes in the classification tree. Let, without loss of generality, the nodes in the classification tree are indexed from 1 to m in some deterministic but random order. Let the n dimensional feature vector at node i be $y_i=\{y_1, y_2, \ldots, y_n\}$. Let the splitting rule $f_i$ at each node i be of the form $x^t y_i \leq \theta_i$, where $\theta_i$ is the threshold value. In one embodiment, the function f is given before the use of this technique. It could be a classifier of a face, of marks on a form on a page, etc. In one embodiment, the particular functions are implemented in nodes in the decision tree. The tree was trained ahead of time. In one embodiment, the class of functions are "linear functions" or "dot product functions." These are most widely used in decision trees.

One can represent the splitting rule at node i using a randomized function $f_i(x, y_i, \theta_i) \to \{0, 1\}$ where 1 indicates that the splitting rule is satisfied (i.e., "yes"). The function $f_i$ may be defined as:

$$f_i(x, y_i, \theta_i) = \{ \\ 1 \text{ if } x^t y_i - \theta_i <= 0 \\ 0 \text{ otherwise} \\ \}$$

The user executes m OPE protocols with the classifier where the user learns either 0 or 1 for each node index i (i.e. the output of $f_i$ and nothing else), and the classifier learns nothing about the user's input and the output. Finally, the user constructs a bit vector Z of all the outputs and executes another protocol with the classifier to obliviously learn the class label.

In order to obliviously evaluate the final classification decision (i.e., the class assigned to the leaf node in the classification tree) using the above described method, one needs to convert the binary decisions obliviously evaluated at each internal node into a polynomial. However, constructing a polynomial for this scenario, in general, is prohibitively expensive except for simple cases where there is only a few nodes in the classification tree since the number of possibilities exponentially grows with the number of internal nodes m. Therefore, in one embodiment, a separate technique to obliviously obtain the class using an additive homomorphic cryptosystem for large classification trees is used.

For each path in the classification tree, the user computes two vectors Z' and Z" as follows and gives to the classifier:

$$Z'[i]=E(Z[i])$$

$$Z''[i]=E(1-Z[i]),$$

where E is the additive homomorphic encryption and $1 \leq i \leq m$. Note that each path corresponds to a leaf node and its related class. The user has the private key. The classifier chooses a random number $r \in \mathbb{Z}_p$.

For each node in the path t with index j, the classifier picks Z'[j] or Z"[j] depending on the classification decision and computes $(Z'[j])^r$ or $(Z''[j])^r$. The classifier multiplies the computed values for all the indexes along each path (from root to leaf node)]. This value is referred to herein as $u_t$. The classifier computes $$v_t = u_t \times E(-h \times r) \times E(w_t),$$

where h is the number of internal nodes in the path (i.e., the tree height), $w_t$ is the class label associated with the leaf node of path t and $1 \leq t \leq P$, performing P separate multiplications. The classifier creates the vector $V=\{v_1, v_2, \ldots, v_P\}$. When the user decrypts each element in V, there will be only one element in the domain of the class values and thus the user obtains the corresponding class for her input x.

The classifier may introduce fake nodes to further hide the classification tree at the expense of additional computational and communication cost.

Complexity Analysis

The following shows a high level complexity analysis of the internal nodes in the classification tree. There are n features, m internal nodes. Assume that the protocol for the complete OT based approach operates over a finite field $\mathbb{F}_p$, of prime order and the attribute values are of l-bits ($0-2^l$). The same OPE protocols are applied by considering each $f_i$ as a collection of n degree one (d=1) polynomials. For the OPE protocol using $OT_1^2$, a total of nmdl=mnl $OT_1^2$ operations are performed, that is, roughly 5nml exponentiations and 6nml $\log_2|p|$ bits. For the OPE protocol using HE, a total of 2nl HE operations are performed, that is, 2nl exponentiations and 2nl $\log_2|p|$ bits. Notice that the complexity of the latter is independent of m since the encrypted values can be reused. (Note that the addition, multiplication and division operations are not considered in the above analysis.)

An Example of a Protocol

FIG. 3 illustrates pseudo code of one embodiment of an algorithm performed at the classifier. Such pseudo is well understood to those skilled in the art.

Figure 4:
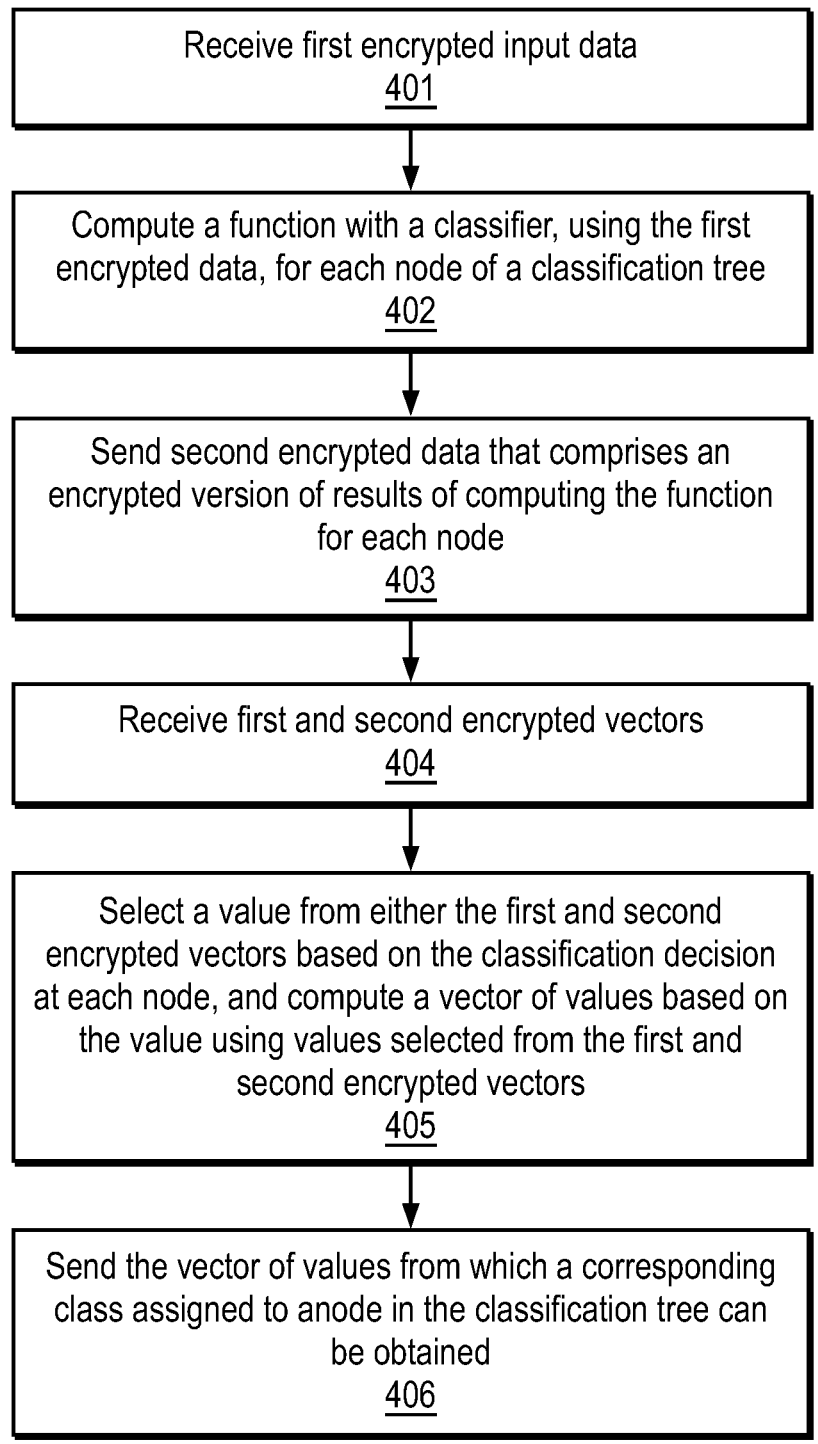
FIG. 4 is a flow diagram of one embodiment of a process for classifying data using a linear classification tree.

FIG. 4 is a flow diagram of one embodiment of a process for classifying data using a linear classification tree (e.g., decision tree). The process is performed by processing logic that may comprise hardware (circuitry, dedicated logic, etc.), software (such as is run on a general purpose computer system or a dedicated machine), or a combination of both. The processing logic may be part of a classifier. The processing logic may execute instructions that implement the pseudo code described in FIG. 3.

Referring to FIG. 4, the process begins by processing logic receiving first encrypted input data (processing block 401). In one embodiment, the first encrypted input data comprises input data that has been bit-wise encrypted using an additive homomorphic cryptosystem.

Next, processing logic computes a function with a classifier, using the first encrypted data, for each node of a classification tree (processing block 402). In one embodiment, the classification tree comprises a decision tree. In one embodiment, the decision tree is a multivariate tree having one or more multiple-feature splits. In one embodiment, the decision tree is unbalanced. In one embodiment, the decision tree includes one or more 1-of-2 splits. In one embodiment, the function represents a splitting rule.

After computing the function for each node on a classification tree, processing logic sends second encrypted data that comprises an encrypted version of results of computing the function for said each node (processing block 403).

Subsequently, processing logic receives first and second encrypted vectors (processing block 404). The first encrypted vector contains an encrypted version of a vector containing a classification decision at each node in the classification tree, and the second encrypted vector contains a complementary of the vector containing a classification decision at each node in the classification tree Note that a complementary binary vector is where each "0" entry is replaced by a "1" and each "1" is replaced by a "0". In one embodiment, the first and second encrypted vectors are P-dimensional encrypted binary vectors. In one embodiment, the order of encrypted data associated with each node in the second encrypted data is not indicative of node location in the classification tree. In one embodiment, the classification decision comprises a splitting decision.

Using the data of the first and second encrypted vectors, for each node in a path in the classification tree, processing logic selects a value from either the first and second encrypted vectors based on the classification decision at said each node, and computes a vector of values based on the value using values selected from the first and second encrypted vectors (processing block 405). In one embodiment, computing the vector of values is performed using a number of nodes in a path, a class label associated with a node in the path, the vector of values and an encryption function. The encryption function may be the same homomorphic encryption function used to encrypt the vector of values (e.g., the Paillier homomorphic cryptosystem).

Thereafter, processing logic sends the vector of values from which a corresponding class assigned to a node in the classification tree can be obtained (processing block 406).

An HE Based Approach

The high-level technique is that the user bit-wise encrypt the input data x using an additive homomorphic cryptosystem and the classifier uses these encrypted values to compute $x^t y_i - \theta_i$ over the encrypted data for each node i. The user decrypts these encrypted values to decide the splitting decision at each node. Notice that, unlike the OT based approach, the amount of work by the user to evaluate the internal nodes is independent of the number of nodes m in the classification tree, which greatly reduces the computational cost at the user. Once the bit vector Z is computed, the evaluation of the class label is similar to that described above in the OT based approach.

More specifically, for the elements in x, the user computes the $v_{ij}$ values as in the OPE protocol and then encrypts each $v_{ij}$ value using an additive homomorphic cryptosystem that the user initiates (i.e., the user has the private key). The user sends the n×l encrypted $v_{ij}$'s to the classifier. For each element in $y_i$, the classifier picks the correct encrypted $v_{ij}$'s based on the non-zero bit position of the element and multiplies them together in order to compute encrypted $x^t y$. The classifier subtracts the threshold value $\theta_i$ by multiplying it with the encrypted additive inverse of $\theta_i$. For each node i, the classifier performs the above computation and prepares a vector of m encrypted elements. The user decrypts this vector and computes a bit vector Z indicating the splitting decision at each node. The remaining interactions between the user and the classifier are similar to that OT approach described above. Notice that this approach rely only on the availability of an additive homomorphic cryptosystem.

An Example Protocol

FIG. 5 is pseudo code for one embodiment of an algorithm of the operations performed by the user when using the classifier.

Figure 6:
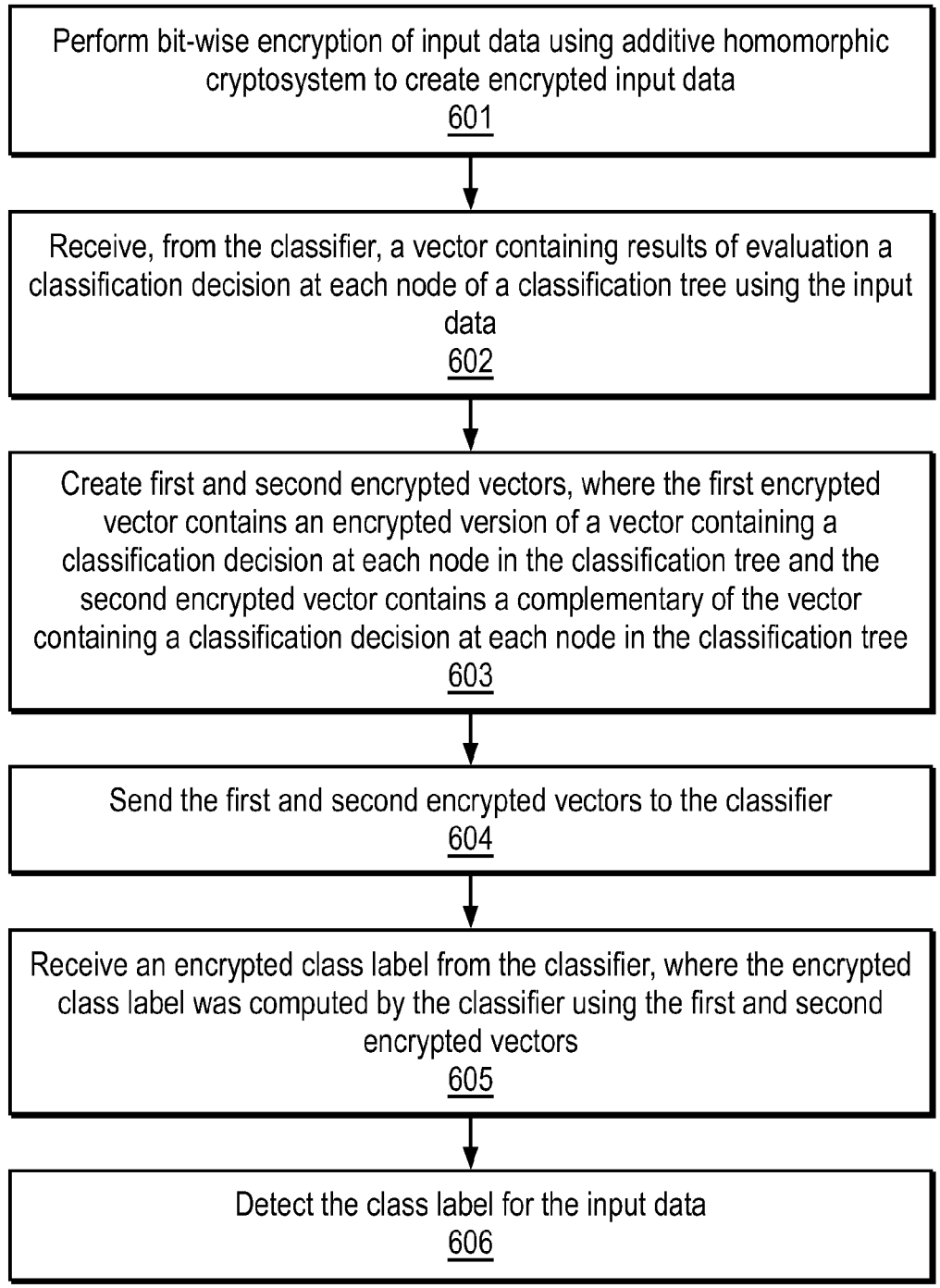
FIG. 6 is a flow diagram of one embodiment of a process for classifying data using a linear classification tree.

FIG. 6 is a flow diagram of one embodiment of a process for classifying data using a linear classification tree (e.g., decision tree). The process is performed by processing logic that may comprise hardware (circuitry, dedicated logic, etc.), software (such as is run on a general purpose computer system or a dedicated machine), or a combination of both. In one embodiment, the processing logic is part of a client that is communicating with the classifier (or a device or service that is accessing and/or using the classifier). The processing logic may execute instructions that implement the pseudo code described in FIG. 5.

Referring to FIG. 6, the process begins by processing logic performing bit-wise encryption of input data using additive homomorphic cryptosystem to create encrypted input data (processing block 601). Processing logic sends this information to a classifier.

Subsequently, processing logic receives, from the classifier, a vector containing results of evaluating a classification decision at each node of a classification tree using the input data (processing block 602).

Using data in the vector, processing logic creates first and second encrypted vectors, where the first encrypted vector containing an encrypted version of a vector containing a classification decision at each node in the classification tree and the second encrypted vector containing a complementary of the vector containing a classification decision at each node in the classification tree (processing block 603) and sends the first and second encrypted vectors to the classifier (processing block 604).

Next, processing logic receives an encrypted class label from the classifier, where the encrypted class label was computed by the classifier using the first and second encrypted vectors (processing block 605). From this information, processing logic detects the class label for the input data (processing block 606).

FIG. 7 is pseudo code for one embodiment of an algorithm performed at a classifier for evaluating the splitting rule at each internal node.

Figure 8:
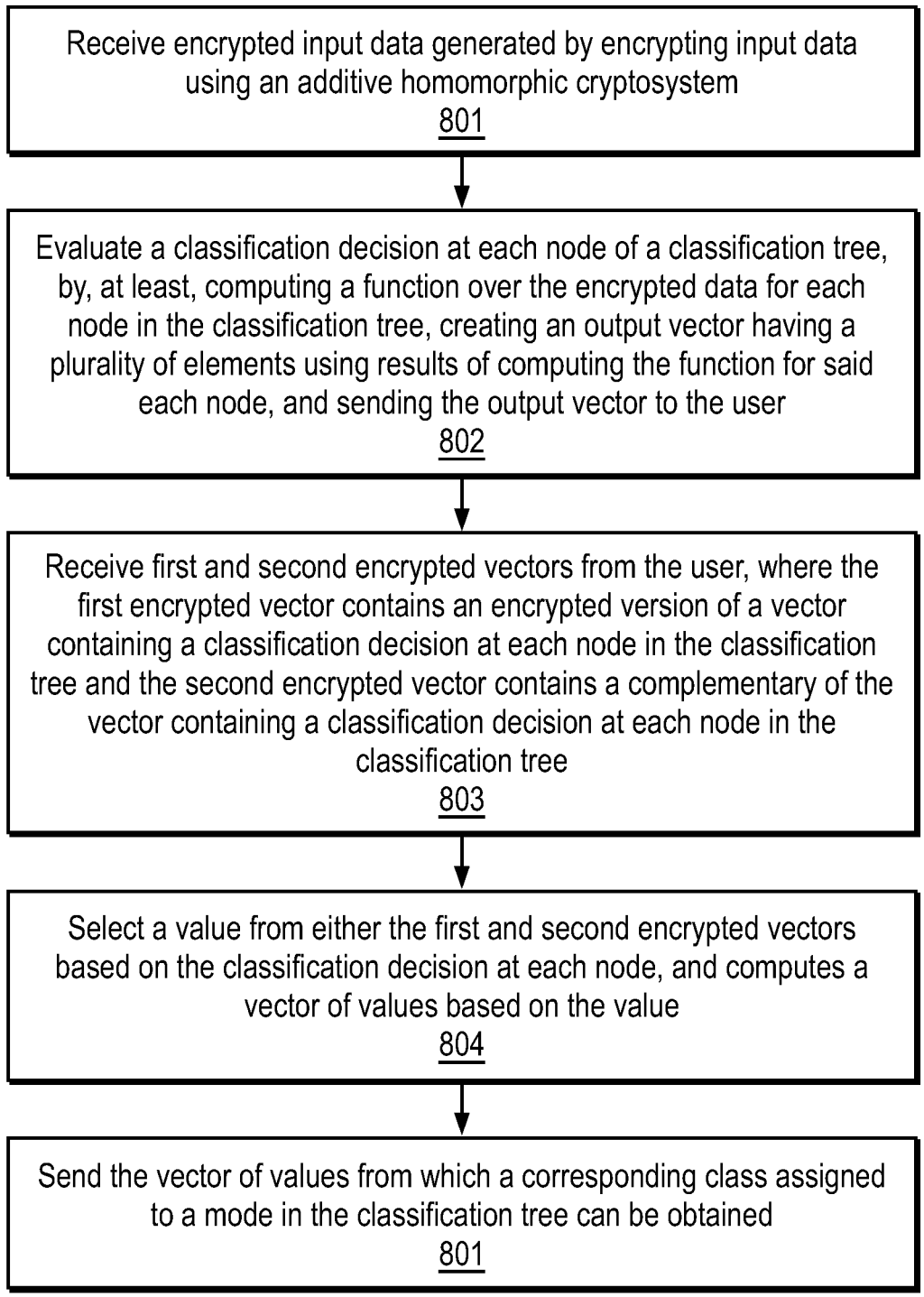
FIG. 8 is a flow diagram of one embodiment of a process for splitting rule evaluation at a classifier that performs classification using a classification tree.

FIG. 8 is a flow diagram of one embodiment of a process for splitting rule evaluation at a classifier that performs classification using a classification tree (e.g., decision tree). The process is performed by processing logic that may comprise hardware (circuitry, dedicated logic, etc.), software (such as is run on a general purpose computer system or a dedicated machine), or a combination of both. In one embodiment, the processing logic is part of the classifier. The processing logic may execute instructions that implement the pseudo code described in FIG. 7.

Referring to FIG. 8, the process begins by processing logic receiving encrypted input data generated by encrypting input data using an additive homomorphic cryptosystem (processing block 801).

Using the encrypted input data, processing logic evaluates a classification decision at each node of a classification tree, by, at least, computing a function over the encrypted data for each node in the classification tree, creating an output vector having a plurality of elements using results of computing the function for said each node, and sending the output vector to the user (processing block 802). In one embodiment, the classification tree comprises a decision tree. In one embodiment, the decision tree is a multivariate tree having one or more multiple-feature splits. In one embodiment, the decision tree is unbalanced. In one embodiment, the decision tree includes one or more 1-of-2 splits. In one embodiment, the classification decision comprises a splitting decision. In one embodiment, the function represents a splitting rule.

Subsequently, processing receives first and second encrypted vectors from the user, where the first encrypted vector contains an encrypted version of a vector containing a classification decision at each node in the classification tree and the second encrypted vector contains a complementary of the vector containing a classification decision at each node in the classification tree (processing block 803).

Using the data of the first and second encrypted vectors, processing logic, for each node in a path in the classification tree, selects a value from either the first and second encrypted vectors based on the classification decision at said each node, and computes a vector of values based on the value (processing block 804).

Thereafter, processing logic sends the vector of values from which a corresponding class assigned to a mode in the classification tree can be obtained (processing block 805).

Complexity Analysis

For the evaluation of internal nodes, the user performs nl homomorphic encryption operations. For each internal node, the classifier performs one homomorphic encryption operations and n+1 modular multiplications in the worst case. Overall, the classifier performs m encryptions and (n+1)m modular multiplications to evaluate the internal nodes. For the evaluation of the leaf nodes, the user performs m decryptions and 2m encryptions and the classifier performs (h+1)P modular multiplications and P encryptions. Overall, the user sends nl+2m ciphertexts and the classifier m+P ciphertexts.

Assume that the modular multiplication takes O(log n) and the modular exponentiation takes O(n log n) under the modulus n. If a Paillier cryptosystem with modulus n is used, the overall computational complexity at the user is $$O((nl+2m+m)p^2 \log p^2)=O((nl+3m)p^2 \log p^2),$$

and at the classifier is $$O((m+P)p^2 \log p^2+((n+1)m+(h+1)P)\log p^2= \\ O((m+P)p^2 \log p^2+(nm+hP)\log p^2).$$

The overall communication complexity is $O((nl+2n+m+P) \log p^2)$ bits.

Multivariate Decision Trees

Note that the HE based approach can easily be extended to evaluate linear decisions having multiple features at each node in multivariate decision trees. In that case, each $y_i$ has one or more non-zero elements. While there is no change to the complexity at the user, the computational complexity at classifier increases. For each node, in the worst case, the classifier needs to perform computations O(n) times the univariate case.

EXAMPLES

Some examples are provided below to make the basic approach clear. Note that our examples are mainly for the OT based approach, but can trivially be converted to the HE based approach.

A High-Level Example

Figure 9:
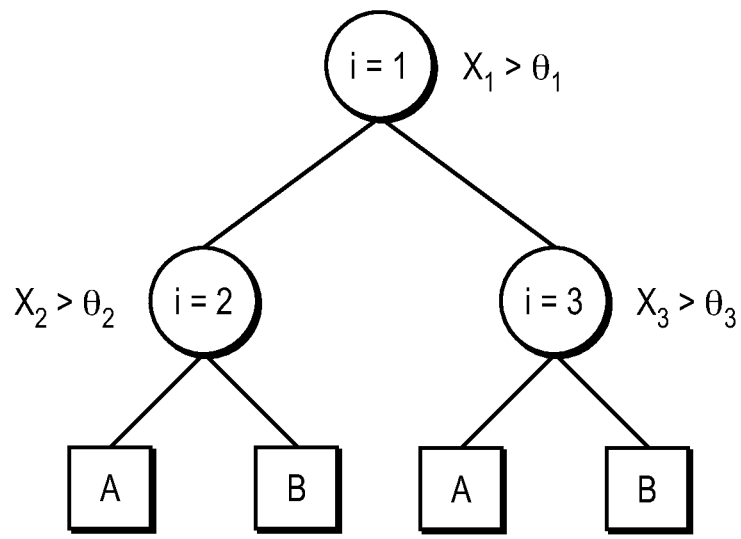
FIG. 9 illustrates an example classification tree with notations used herein.

Let's consider a simple example where the classification tree looks like in FIG. 9. There are three features $x_1$, $x_2$, $x_3$, and two class labels A and B.

We have the following:

For the node 1, $y_1=\{1, 0, 0\}$, $f_1(x, y_1, \theta_1)=r_1x_1-r_1\theta_1$.
For the node 2, $y_2=\{0, 1, 0\}$, $f_2(x, y_2, \theta_2)=r_2x_2-r_2\theta_2$.
For the node 3, $y3=\{0, 1, 0\}$, $f_3(x, y_3, \theta_3)=r_3x_2-r_3\theta_3$.

Since this is a relatively simple example, a function is constructed to decide the final output and use OPE. Let the function be g. The function g follows the following input Table 2. (Note that the table can be further simplified.)

TABLE 2

| Classification function | | | |
|---|---|---|---|
| $z_1$ | $z_2$ | $z_3$ | Class |
| 1 | 1 | N/A | A |
| 1 | 0 | N/A | B |
| 0 | N/A | 1 | A |
| 0 | N/A | 0 | B |

$$g(z_1,z_2,z_3)=z_1z_2A+z_1\bar{z}_2B+\bar{z}_1z_2A+\bar{z}_1\bar{z}_2B$$

The user evaluates $Z=\{z_1, z_2, z_3\}$ and substitute these values to $g(Z)$ to obtain the class.

Detailed Example 1

OPE and One Splitting Rule Evaluation

The following are the parameters. The objective is to obliviously evaluate the satisfiability of a split at a node in the classification tree.
  p=383 (a 9-bit prime)
  g=379 (a generator of the multiplicative cyclic group $\mathbb{Z}^*_{383}$)
  q=128 (For the comparison protocol to work, q<p/2. The length of q, l=7 bits)
  $f(x)=5x$ (The degree d=1)
  Let's assume the user has the value x=3 and the classifier's threshold value θ=10. Note that the threshold is based on the design of the classifier, which is standard in the art. The objective of the protocol is for the user to know the value (sign) of $f(x)-\theta$ without letting the classifier know either the output or the input. Without the OPE protocol, the answer is 5·3−10=5.

The user computes the following matrix V (in this case, it is a vector, as the degree of $f$ is 1) where $v_{(i,j)}=2^{j-1} \cdot v^i$, with i being the exponent and j being the bit position, that is, $$V = (2^0 \cdot 3 \quad 2^1 \cdot 3 \quad 2^2 \cdot 3 \quad 2^3 \cdot 3 \quad 2^4 \cdot 3 \quad 2^5 \cdot 96 \quad 2^6 \cdot 3)$$
$$= (3 \quad 6 \quad 12 \quad 24 \quad 48 \quad 96 \quad 192)$$

The user also computes the following random value matrix R where each value is bounded by q/dr, that is 128/7, and has a one-to-one correspondence to the values in V.

R=(11 16 1 12 3 5 2).

The classifier gets either $r_{ij}$ or $v_{ij}+r_{ij}$ for each coefficient i depending on the value of the $j^{th}$ bit of the coefficient. The user does not learn which components the classifier gets as they perform this operation through l=7$OT_1^2$ protocols. Hence, the user does not learn the coefficient 5 of $f(x)$. At the same time, the classifier does not learn the user's input value x=5 since the classifier only learns one value out of the two values sent by the user for each $OT_1^2$ protocol.

The classifier first constructs the coefficient bit matrix C where $c_{ij}$ is the value of the $j^{th}$ bit of the coefficient i.

C=(1 0 1 0 0 0 0)

Using $OT_1^2$, the classifier gets the following values:

M=(3+11 16 12+1 3 5 2)

because only the first and third coefficients are non-zero, and hence the classifier picks $v_{ij}$ and $r_{ij}$ values for those two positions and only $v_{ij}$ for other positions in M.

The classifier computes $\Sigma m_{ij}$=65 and sends the value $o_s$=65−10=55. The user computes $o_s-\Sigma r_{ij}$=55−50=5 and decides that it satisfies the splitting rule $f(x)>t$ (since 5<128). Notice that the classifier does not learn the splitting decision as the final class label is hidden inside a random value which only the user knows.

Detailed Example 2

OPE and One Splitting Rule Evaluation

Everything in the detailed example 1 except the x value of the user remains unchanged for this example. Here, let x=1.

The user computes the following values:

V=(1 2 4 8 16 32 64),

R=(13 11 2 13 5 4 1).

The classifier gets the following values:

M=(1+13 11 4+2 13 5 4 1)

The classifier computes $\Sigma m_{ij}$=54 and sends the value $o_s$=54−10=44. The user computes $o_s-\Sigma r_{ij}$=44−49=−5=378 and decides that it does not satisfy the splitting rule $f(x)>\theta$ (since 378>128).

Detailed Example 3

OPE and One Splitting Rule Evaluation (Higher Degree)

Everything in the detailed example 1 except the function $f(x)$ remains unchanged for this example. Let $f(x)=5x+2x^2$ (d=2). All the above examples use degree-1 polynomials; here, however, a degree-2 polynomial is used in this example. One can trivially extend this to higher degree polynomials.

The user computes the following:

$$V = \begin{pmatrix} 3 & 6 & 12 & 24 & 48 & 96 & 192 \\ 9 & 18 & 36 & 72 & 144 & 288 & 576 \end{pmatrix},$$

$$R = \begin{pmatrix} 8 & 1 & 7 & 3 & 6 & 2 & 1 \\ 6 & 4 & 3 & 7 & 5 & 4 & 3 \end{pmatrix}.$$

The classifier gets the following values through $OT_1^2$ protocols:

$$M = \begin{pmatrix} 3+8 & 1 & 12+7 & 3 & 6 & 2 & 1 \\ 6 & 18+4 & 3 & 7 & 5 & 4 & 3 \end{pmatrix}$$

The classifier computes $\Sigma_{i,j} m_{ij}$=54 and sends the value $o_s$=93−10=83. The user computes $o_s-\Sigma r_{(i,j)}$=83−60=33 and decides that it satisfies the splitting rule $f(x)>\theta$ (since 33<128).

Note that the value 83 does not indicate anything about the satisfiability to the classifier. For example, the sum of random values can be greater than the output of the classifier and in this case, the user's input does not satisfy the splitting rule even if the classifiers output is less than 128.

Detailed Example 4

A Simple Classification Tree

Figure 10:
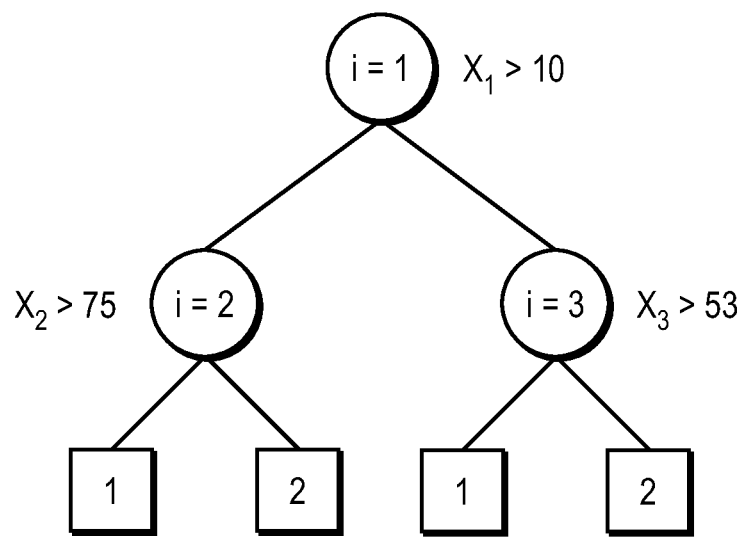
FIG. 10 illustrates an instance of the classification tree in FIG. 9.

FIG. 10 shows the simple classification tree under consideration. Referring to FIG. 10, there are three components $x_1$, $x_2$, $x_3$. The two class labels A and B are encoded as 1 and 2 respectively. The splitting rule output is a binary value where 1 indicates that the user's input satisfies the classification rule of the form $x_i > \theta_i$.

This example deals with the multi-variate case. Specifically, the functions are formed as a collection of degree one functions.

Let g be the decision function as described above. Using Table 2, g is obtained as follows:

$$g(z_1, z_2, z_3) = 1 \cdot z_1 z_2 + 2 \cdot z_1 \bar{z}_2 + 1 \cdot \bar{z}_1 z_2 + 2 \cdot \bar{z}_1 \bar{z}_2$$
$$= (1 \cdot z_1 z_2 + z_1 \bar{z}_2) + 2 \cdot (z_1 z_2 + \bar{z}_1 \bar{z}_2)$$
$$= 1 \cdot z_2 + 2 \cdot (1 - z_2)$$
$$= 2 + 127 z_2$$

where $z_i$ is the satisfiability of the rule at node i.

First, how the user obliviously evaluates the internal nodes of the classification tree is examined. The user and the classifier execute three OPE protocols in an aggregated approach as follows:

Assume that the user's input is x={15, 50, 25}. Using the same public parameters as above, the user computes V and R as follows:

$$V = \begin{pmatrix} 15 & 30 & 60 & 120 & 240 & 97 & 184 \\ 50 & 100 & 200 & 17 & 34 & 68 & 136 \\ 25 & 50 & 100 & 200 & 17 & 34 & 68 \end{pmatrix},$$

$$R_1 = \begin{pmatrix} 1 & 4 & 3 & 5 & 1 & 2 & 3 \\ 2 & 3 & 2 & 5 & 6 & 1 & 4 \\ 2 & 1 & 1 & 3 & 5 & 4 & 2 \end{pmatrix},$$

$$R_2 = \begin{pmatrix} 2 & 4 & 3 & 2 & 2 & 2 & 5 \\ 2 & 3 & 5 & 1 & 6 & 1 & 2 \\ 4 & 1 & 3 & 1 & 5 & 6 & 2 \end{pmatrix},$$

$$R_3 = \begin{pmatrix} 1 & 2 & 5 & 2 & 2 & 2 & 1 \\ 1 & 3 & 3 & 1 & 2 & 1 & 4 \\ 3 & 2 & 1 & 2 & 5 & 3 & 2 \end{pmatrix}.$$

The classifier gets the following values for each internal node:
For the node 1, $$M_1 = \begin{pmatrix} 15+1 & 4 & 3 & 5 & 1 & 2 & 3 \\ 2 & 3 & 2 & 5 & 6 & 1 & 4 \\ 2 & 1 & 1 & 3 & 5 & 4 & 2 \end{pmatrix}$$

For the node 2, $$M_2 = \begin{pmatrix} 2 & 4 & 3 & 2 & 2 & 2 & 5 \\ 50+2 & 3 & 5 & 1 & 6 & 1 & 2 \\ 4 & 1 & 3 & 1 & 5 & 6 & 2 \end{pmatrix}$$

For the node 3, $$M_3 = \begin{pmatrix} 1 & 2 & 5 & 2 & 2 & 2 & 1 \\ 50+1 & 3 & 3 & 1 & 2 & 1 & 4 \\ 3 & 2 & 1 & 2 & 5 & 3 & 2 \end{pmatrix}$$

Note that the random values will be much larger than the values in these example in a practical system. Small numbers are used here for simplicity.

For the node 1, the classifier computes $\Sigma M_1 = 75$ and sends the value $o_s = 75 - 10 = 65$. The user computes $o_s - \Sigma R_1 = 65 - 60 = 5$ and decides that it satisfies the splitting rule $f(x) > \theta$ (since 5<128). Therefore, $z_1 = 1$.

For the node 2, the classifier computes $\Sigma M_2 = 112$ and sends the value $o_s = 112 - 75 = 37$. The user computes $o_s - \Sigma R_2 = 37 - 62 = -25 = 358$ and decides that it does not satisfy the splitting rule $f(x) > \theta$ (since 358>128). Therefore, $z_2 = 0$.

For the node 3, the user similarly determines that $z_3 = 0$.

Now the function g, the classification decision, is evaluated obliviously.

The user computes V and R as follows:

$$V = \begin{pmatrix} 1 & 2 & 4 & 8 & 16 & 32 & 64 \\ 0 & 0 & 0 & 0 & 0 & 0 & 0 \\ 0 & 0 & 0 & 0 & 0 & 0 & 0 \end{pmatrix},$$

$$R = \begin{pmatrix} 2 & 1 & 4 & 2 & 5 & 3 & 1 \\ 1 & 5 & 3 & 2 & 1 & 2 & 4 \\ 1 & 3 & 1 & 2 & 5 & 3 & 4 \end{pmatrix}.$$

The classifier gets the following values to evaluate $g(Z) = 382 z_2 + 2$, $$M = \begin{pmatrix} 2 & 1 & 4 & 2 & 5 & 3 & 1 \\ 0+1 & 0+5 & 0+3 & 0+2 & 0+1 & 0+2 & 0+4 \\ 1 & 3 & 1 & 2 & 5 & 3 & 4 \end{pmatrix}.$$

The classifier computes $\Sigma M = 55$ and sends $o_s = 55 + 2 = 57$. The user computes $o_s - \Sigma R = 57 - 55 = 2$ and obliviously decides that the class is B.

As can be seen, the OPE protocol at each node ensures that the classifier does not learn x and the splitting decision, and that the user does not learn the splitting rule.

An Example of a Computer System

Figure 11:
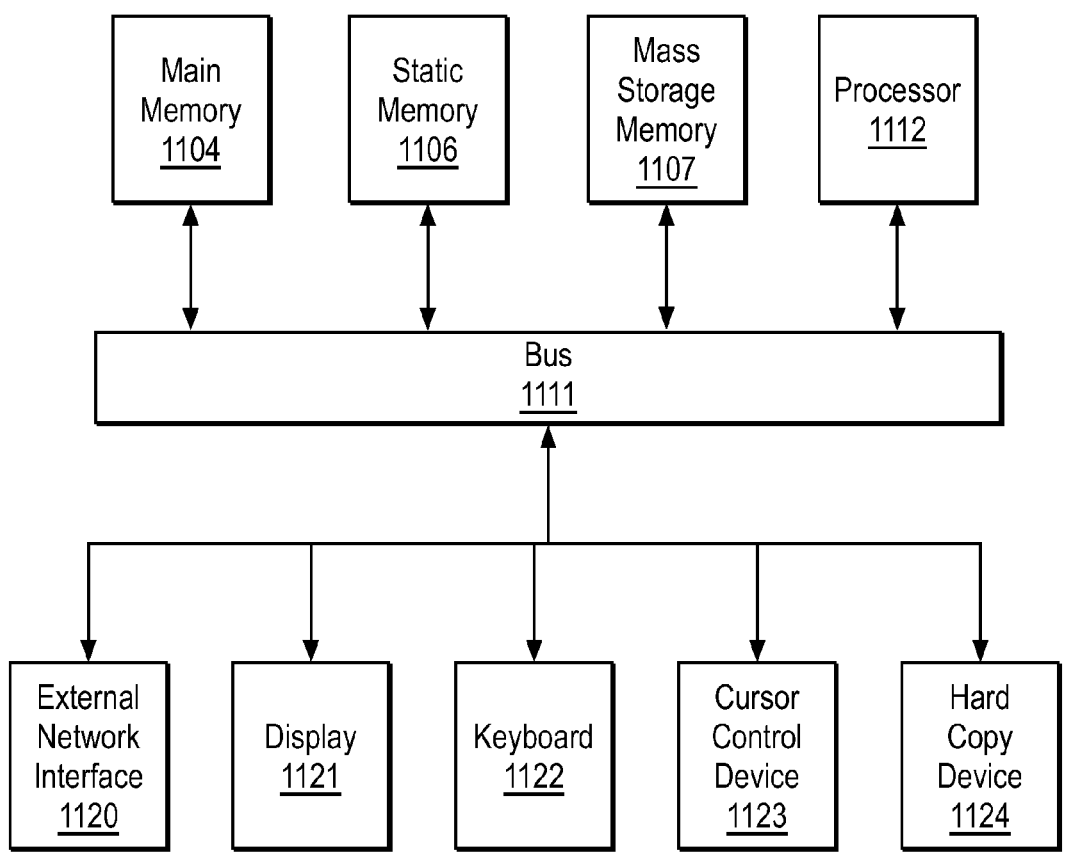
FIG. 11 is a block diagram of a computer system.

FIG. 11 is a block diagram of an exemplary computer system that may perform one or more of the operations described herein. Referring to FIG. 11, computer system 1100 may comprise an exemplary client or server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium™, PowerPC™, Alpha™ etc.

System 1100 further comprises a random access memory (RAM), or other dynamic storage device 1104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions. The instructions may be used to perform operations described above.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for marking information on a medium such as paper, film, or similar types of media. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
receiving first encrypted input data, wherein the first encrypted input data comprises input data that has been bit-wise encrypted using an additive homomorphic cryptosystem;
computing, with a processor, a function with a classifier, using the first encrypted data, for each node of a classification tree, the classification tree comprising a decision tree that is a multivariate tree having one or more multiple-feature splits;
sending second encrypted data that comprises an encrypted version of results of computing the function for said each node;
receiving first and second encrypted vectors, each encrypted using the additive homomorphic cryptosystem, the first encrypted vector containing an encrypted version of a vector containing a classification decision at each node in the classification tree and the second encrypted vector containing a complementary of the vector containing a classification decision at each node in the classification tree, wherein each of the first and second encrypted vectors are P-dimensional encrypted binary vectors, and the order of encrypted data in the second vector is not indicative of node location in the classification tree;
for each node in a path in the classification tree,
selecting a value from either the first and second encrypted vectors based on the classification decision at said each node, and
computing a vector of values using the additive homomorphic cryptosystem based on the value using values selected from the first and second encrypted vectors; and
sending the vector of values from which decryption of each value in the vector results in a single element in a domain of class values and a corresponding class in the classification tree can be obtained for the input data.

2. The method defined in claim 1, wherein the decision tree is unbalanced.

3. The method defined in claim 1, wherein the decision tree includes one or more 1-of-2 splits.

4. The method defined in claim 1, wherein the classification decision comprises a splitting decision.

5. The method defined in claim 1, wherein the function represents a splitting rule.

6. The method defined in claim 1, wherein order of encrypted data associated with each node in the second encrypted data is not indicative of node location in the classification tree.

7. The method defined in claim 1, wherein computing the vector of values is performed using a number of nodes in a path, a class label associated with a node in the path, the vector of values and an encryption function.

8. An article of manufacture comprising a non-transitory computer readable medium having computer readable code stored thereon, which, when executed by a system, causes the system to:
receive first encrypted input data, wherein the first encrypted input data comprises input data that has been bit-wise encrypted using an additive homomorphic cryptosystem;
compute a function with a classifier, using the first encrypted data, for each node of a classification tree, the classification tree comprising a decision tree that is a multivariate tree having one or more multiple-feature splits;
send second encrypted data that comprises an encrypted version of results of computing the function for said each node;
receive first and second encrypted vectors, each encrypted using the additive homomorphic cryptosystem, the first encrypted vector containing an encrypted version of a vector containing a classification decision at each node in the classification tree and the second encrypted vector containing a complementary of the vector containing a classification decision at each node in the classification tree, wherein each of the first and second encrypted vectors are P-dimensional encrypted binary vectors, and the order of encrypted data in the second vector is not indicative of node location in the classification tree;
for each node in a path in the classification tree,
select a value from either the first and second encrypted vectors based on the classification decision at said each node, and
compute a vector of values using the additive homomorphic cryptosystem based on the value using values selected from the first and second encrypted vectors; and
send the vector of values from which decryption of each value in the vector results in a single element in a domain of class values and a corresponding class in the classification tree can be obtained for the input data.

9. The article of manufacture defined in claim 8, wherein the decision tree is unbalanced.

10. The article of manufacture defined in claim 8, wherein the decision tree includes one or more 1-of-2 splits.

11. The article of manufacture defined in claim 8, wherein the classification decision comprises a splitting decision.

12. The article of manufacture defined in claim 8, wherein the function represents a splitting rule.

13. The article of manufacture defined in claim 8, wherein order of encrypted data associated with each node in the second encrypted data is not indicative of node location in the classification tree.

14. The article of manufacture defined in claim 8, wherein the computation of the vector of values is performed using a number of nodes in a path, a class label associated with a node in the path, the vector of values and an encryption function.

* * * * *